(12) United States Patent
Francalanci et al.

(10) Patent No.: US 11,920,262 B2
(45) Date of Patent: Mar. 5, 2024

(54) SINGLE-STEP PROCESS FOR THE PRODUCTION OF A CARBON FIBER PRECURSOR

(71) Applicant: Montefibre Mae Technologies S.r.l., Milan (IT)

(72) Inventors: Franco Francalanci, Uzzano (IT); Ana Paula Vidigal, Lisbon (PT)

(73) Assignee: Montefibre Mae Technologies S.r.l., Milan (IT)

( * ) Notice: Subject to any disclaimer, the term of this patent is extended or adjusted under 35 U.S.C. 154(b) by 0 days.

(21) Appl. No.: 17/826,615

(22) Filed: May 27, 2022

(65) Prior Publication Data
US 2022/0380946 A1 Dec. 1, 2022

(30) Foreign Application Priority Data
May 31, 2021 (IT) ........................ 102021000014159

(51) Int. Cl.
| | | |
|---|---|---|
| *C08F 2/16* | (2006.01) | |
| *C08F 2/38* | (2006.01) | |
| *C08F 4/04* | (2006.01) | |
| *C08F 218/08* | (2006.01) | |
| *C08F 220/44* | (2006.01) | |
| *C08F 220/46* | (2006.01) | |
| *C08L 33/20* | (2006.01) | |
| *D01D 1/02* | (2006.01) | |
| *D01D 5/06* | (2006.01) | |
| *D01D 5/12* | (2006.01) | |
| *D01D 5/16* | (2006.01) | |
| *D01D 7/00* | (2006.01) | |
| *D01D 10/06* | (2006.01) | |
| *D01F 1/02* | (2006.01) | |
| *D01F 6/18* | (2006.01) | |
| *D01F 6/38* | (2006.01) | |
| *D01F 9/22* | (2006.01) | |

(52) U.S. Cl.
CPC .............. *D01F 9/22* (2013.01); *C08F 220/44* (2013.01); *D01D 1/02* (2013.01); *D01F 6/38* (2013.01); *D10B 2101/12* (2013.01); *D10B 2321/10* (2013.01)

(58) Field of Classification Search
CPC ...... C08F 2/06; C08F 2/16; C08F 2/38; C08F 4/04; C08F 218/08; C08F 220/46; C08J 2333/20; C08L 33/20; D01D 1/02; D01D 5/06; D01D 5/12; D01D 5/16; D01D 7/00; D01D 10/06; D01F 1/02; D01F 6/18; D01F 6/38; D10B 2321/10
USPC ............ 264/182, 178 F, 210.4, 210.7, 210.8, 264/211.12, 211.14, 211.15, 233, 331.16, 264/331.18; 524/750, 831; 525/230; 526/219.5, 318.2, 342
See application file for complete search history.

(56) References Cited

U.S. PATENT DOCUMENTS

| | | | | |
|---|---|---|---|---|
| 3,966,666 | A | * 6/1976 | Melacini | ................... C08J 3/09 |
| | | | | 264/182 X |
| 2005/0161156 | A1 | * 7/2005 | Berrigan | ................. D04H 3/14 |
| | | | | 442/361 |

FOREIGN PATENT DOCUMENTS

| | | | | |
|---|---|---|---|---|
| CN | 101 864 028 A | 10/2010 | | |
| CN | 102 277 629 B | 4/2013 | | |
| CN | 104 372 445 A | 2/2015 | | |
| CN | 105624819 A | * 6/2016 | | ............... D01D 5/06 |
| JP | 2002161114 A | * 6/2002 | | ............... D01F 6/18 |
| JP | 2012 201727 A | 10/2012 | | |
| WO | 2020/102735 A1 | 5/2020 | | |

OTHER PUBLICATIONS

Translation of CN 105624819 A (published on Jun. 1, 2016).*
Translation of JP 2002161114 A (published on Jun. 4, 2002).*
Loredana Guglielmetti, "Italian Search Report and Written Opinion of Italian Application No. IT 102021000014159," The Hague, Italian Patent and Trademarks Office, dated Mar. 3, 2022.

* cited by examiner

*Primary Examiner* — Leo B Tentoni
(74) *Attorney, Agent, or Firm* — Florek & Endres PLLC

(57) ABSTRACT

An integrated and improved, single-step, process for the production of a carbon fiber precursor is described, specifically a process which starts from the comonomers and reaches the spinning step, obtaining the final precursor fiber.

11 Claims, No Drawings

SINGLE-STEP PROCESS FOR THE PRODUCTION OF A CARBON FIBER PRECURSOR

The present invention relates to an integrated and improved, single-step, process for the production of a carbon fiber precursor, specifically a process which starts from the comonomers and reaches the spinning step, obtaining the final fiber precursor.

More specifically, the present invention forms part of the field relating to the production of fiber precursors which provides for the preparation of polymers starting from acrylonitrile or copolymers mainly composed of acrylonitrile (95-99.5% by weight with respect to the total weight of the polymer) and from one or more other co-monomers in a quantity generally ranging from 0.5 to 5% by weight with respect to the total weight of the polymer.

The preferred co-monomers are molecules bearing one or more acid groups such as acrylic acid, itaconic acid, sulfonated styrenes and analogues and optionally neutral vinyl molecules such as methyl acrylate, methyl methacrylate, vinyl acetate, acrylamide and analogues.

The polymers and copolymers thus prepared are then subjected to spinning to produce fiber precursors in the form of tows which are collected on bobbins or in boxes.

The carbon fibers are then obtained by means of a suitable thermal treatment of these fiber "precursors" based on polyacrylonitrile.

There are various industrial processes for the preparation of acrylic fibers, which use different polymerization and spinning methods.

The state of the art can be divided and schematized as follows:

A. Batch Processes (Two-Step).

In two-step batch processes, the polymer is generally produced in an aqueous suspension, isolated and subsequently dissolved in a suitable solvent to be spun and transformed into fiber or fiber precursor in the case of carbon fiber. The solvents most commonly used for the preparation of the spinning solution are: dimethylacetamide (DMAc), dimethylformamide (DMF), an aqueous solution of sodium thiocyanate (NaSCN) and finally, as recently described in patent EP2894243B1, mixtures of dimethylsulfoxide (DMSO) with varying amounts of water.

B. Continuous Processes (One-Step).

In continuous processes, on the other hand, the polymerization takes place in a solvent and the solution thus obtained is directly used in spinning without the intermediate isolation of the polymer. The solvents most commonly used in these processes are: dimethylformamide (DMF), dimethyl sulfoxide (DMSO), aqueous solution of zinc chloride ($ZnCl_2$) and aqueous solution of sodium thiocyanate (NaSCN).

Whereas batch processes have advantages from a management point of view, mainly for large plants as the two polymerization and spinning steps are independent, single-step processes are generally preferred when high-performance carbon fibers are to be obtained.

Single-step processes can be further divided into continuous polymerization or batch polymerization processes.

In the case of processes with polymerization in continuous, the solution of the comonomers in the solvent and a suitable catalyst are generally fed continuously to one or more reactors connected in series. After a predetermined residence time, a solution containing the high-molecular-weight co-polymer produced during the reaction, the unreacted monomer or co-monomers and the non-decomposed catalyst, is collected from the single reactor or from the last reactor connected in series.

The solvents historically used for this type of process are mainly DMF or aqueous solutions of sodium thiocyanate, more recently the preferred solvent, also for its characteristics of low environmental impact and extremely low toxicity, is DMSO. The catalysts used in these processes are generally peroxides or azo-compounds that initiate a radical-type chain reaction by thermal decomposition.

These continuous single-step processes are extremely efficient and allow the production of fiber precursors and carbon fibers having an excellent quality and high performance, but they are not without problems and contraindications.

In particular, continuous processes, by their very nature, are difficult to manage at an industrial level as every problem that arises at one point in the process also has direct and immediate consequences on the other steps of the process with consequent damage to the entire production process (for example a polymerization problem has immediate consequences on the spinning and vice versa).

Furthermore, any change in the operating conditions requires lengthy transition times before reaching steady-state regime, with the consequent production of non-specification material.

Another limitation of continuous processes relates to the lengthy residence time and the possibility of stagnation areas in the entire apparatus which favour the formation of gels inside the reactor or reactors in series. These gels prevent a correct heat exchange and therefore the necessary removal of the reaction heat. The formation of these gels requires frequent stoppages of the plant to provide for the mechanical removal of the gels themselves with associated operating costs and production losses.

The above-mentioned limits of the continuous process are overcome by using a polymerization process in batch mode wherein the solvent, preferably DMSO, the co-monomers and the catalyst are fed, at the beginning of the reaction, to a stirred reactor equipped with a cooling system and left under stirring at a controlled temperature for a predetermined time as described, for example, in JP 2018084002A. At the end of the reaction, the contents of the reactor are discharged, i.e. polymer in solution, unreacted co-monomers and non-decomposed catalyst, said contents then being fed to the subsequent steps of the process, whereas the reactor is ready for a new cycle. In this way, the contents of the reactor are renewed at each cycle without creating stagnation areas of the polymeric solution which, over time, favour the formation of gels.

Furthermore, by operating in batch mode, it is possible to have an easier management of the plants and, for example, in the case of malfunctioning or operational error, the contents of a reactor can be diverted to the waste treatment section, without involving the spinning plants downstream in the problem. These spinning plants can in fact continue to be fed by dope (i.e. a homogeneous solution of fiber precursor) stored in intermediate tanks, or they can be put in stand-by conditions without producing fibers out of specification.

The fiber preparation process, however, considered in its entirety, has various weaknesses that are open to improvement for both optimizing the performance of the products obtained and also in terms of production costs.

A first disadvantage of the process described according to the state of the art lies in the difficulty of adding ammonia, primary amines or secondary amines due to both the aggressive nature of the reactants such as ammonia in gaseous form and the difficulty in obtaining their homogenous dispersion in the highly viscous medium: these additives are known for contributing significantly to the improvement of spinning processes for the production of the precursor and obtaining high-performance carbon fibers. It is known, in fact, that the transformation of the acid end groups of comonomers possibly present, such as for example acrylic acid or itaconic acid, into the respective ammonium salts, in particular facilitates the coagulation phase of the spinning and the oxidation phase in the subsequent treatment for the production of carbon fibers as described in EP3783132A1 and in the references contained therein. The conventional technique tries to solve this problem by treating the dope or the DMSO solvent with gaseous ammonia to be added to the dope in a phase prior to feeding the dope containing ammonia to the spinning machines as described for example in JP 2017186682.

In order to avoid the use of gaseous ammonia and in any case obtain a polymer with a greater hydrophilicity, the use of ammonium itaconate as a comonomer has been claimed (CN105624819A).

Considering the poor solubility of the salt in common organic solvents, its use in aqueous solution has been claimed as also taught by CN104558397A, CN104558395A and CN106589223A. In this case, the ammonium salt of itaconic acid is fed to the polymerization reactor in aqueous solution at the maximum possible concentration to keep the amount of water in the system as low as possible (<0.5% by weight).

For the same reason, the acrylonitrile is also distilled before use to eliminate the water contained therein, generally about 0.5%.

There is therefore technical prejudice on the presence of water in the mixture of the reactants for obtaining, at the end of the process, a water-free spinning solution.

The Applicant has surprisingly found that the presence of water in a significant quantity (1-5% by weight with respect to the weight of the reaction mixture) has no negative effects on the polymerization reaction. Furthermore, as taught by EP 2,894,243 (CN 104,775,174 B), a DMSO dope containing these quantities of water can be advantageously spun to produce a fiber precursor with excellent results.

A further disadvantage of the conventional process is the difficulty in removing the unreacted volatile monomer or comonomers from the dope before feeding it to the subsequent filtration and spinning steps. Existing processes effectively remove most of the unreacted acrylonitrile using, for example, a thin film evaporator (TFE) or stripping column. It is only possible, however, to carry out a complete removal by distilling significant volumes of solvent. It is in fact problematic to produce a good spinning dope with a residual acrylonitrile content of less than 1,000 ppm (0.1%). An acrylonitrile content higher than this limit requires special precautions during the subsequent processing steps in consideration of the carcinogenic nature of acrylonitrile.

The objective of the present invention therefore relates to a process for preparing fiber precursors which overcomes the above-mentioned limits and disadvantages of the known art and which allows significant advantages to be obtained in terms of product quality and production costs.

DETAILED DESCRIPTION OF THE INVENTION

The present invention relates to a process for the production of a carbon fiber precursor comprising the following steps:

i) preparation of an acid comonomer solution selected from itaconic acid or acrylic acid in water containing at least a stoichiometric quantity of ammonia with respect to the acid groups present, wherein the concentration of acid comonomer in water varies within the range of 3% to 50% by weight, the total quantity of water fed to the reactor ranging from 1 to 5% by weight with respect to the total weight of the mass charged into the reactor in step ii);

ii) feeding into the reactor, acrylonitrile or a mixture of acrylonitrile and a neutral vinyl comonomer, the two comonomers acrylonitrile/neutral vinyl comonomer being present in a weight ratio ranging from 95:5 to 99.5:0.5, the (aqueous solution of ammonium salt of the acid comonomer prepared in step i), DMSO, 2-2'-azobisisobutyronitrile AIBN and dodecylmercaptan or octylmercaptan;

iii) keeping the mixture thus obtained under stirring at a temperature ranging from 50 to 80° C., for a time ranging from 10 to 20 hours, preferably from 12 to 15 hours;

iv) discharging the contents of the reactor into a tank kept at a temperature ranging from 35 to 40° C. to slow down or interrupt the reaction;

v) feeding the mixture thus obtained to a thin-film evaporation system (TFE) operating at a temperature ranging from 40 to 80° C., and at a pressure ranging from 5 to 30 mbar abs;

vi) collecting a mixture of acrylonitrile, water and DMSO from the head of the TFE, said mixture being re-used in the preparation of a new reaction batch;

vii) collecting a polymer solution in DMSO from the bottom of the TFE, said solution being diluted with fresh DMSO to reach a concentration ranging from 15 to 25% by weight, preferably from 18 to 22% by weight, with respect to the total weight of the solution;

viii) feeding the homogeneous spinning solution obtained at the end of step vii) to the spinning step or to a storage tank.

In particular, the presence of a greater quantity of water during the polymerization phase simplifies the process and allows production costs to be reduced compared to the known art for various reasons:
- the initial distillation of virgin acrylonitrile can be avoided for eliminating traces of water;
- the use of gaseous ammonia is eliminated;
- common itaconic acid or acrylic acid can be used instead of resorting to the use of more expensive ammonium salts;
- the hydrophilicity of the polymer is improved however by the presence of itaconic acid or acrylic acid in salified form with ammonia, resulting in a homogeneous and reproducible dope
- the removal of unreacted acrylonitrile is more effective thanks to the possibility of removing it in the form of a mixture with water and DMSO, making it possible to recycle all the products recovered in the polymerization reactor.

The spinning step is carried out using the wet spinning process or dry-jet wet spinning process wherein, after the coagulation phase in a coagulation bath consisting of a mixture of water and solvent, the bundle of filaments thus obtained is stretched and washed in succession up to a length of about 10 times the initial length and then subjected to a final washing step with water to remove the last traces of solvent.

Dodecylmercaptan or octylmercaptan act as a molecular-weight regulator.

In step i) for the preparation of the acid comonomer solution, the concentration of acid comonomer in water preferably varies within the range of 3% to 50% by weight, more preferably from 5 to 30%, the total quantity of water fed to the reactor ranging from 1 to 5% by weight with respect to the total weight of the mass charged into the reactor in step ii) of the process according to the present invention.

Total weight of the mass charged into the reactor, in fact, refers to the total weight of the components fed to the reactor in step ii) of the process according to the present invention.

In step i) the neutral vinyl comonomer can be selected from methyl acrylate or vinyl acetate.

In step ii) for feeding into the reactor, 90-150 parts by weight, more preferably 100 parts by weight, of acrylonitrile or a mixture of acrylonitrile and a neutral vinyl comonomer are fed, the two comonomers acrylonitrile/neutral vinyl comonomer being present in a weight ratio ranging from 95:5 to 99.5:0.5; 2-15 parts by weight, more preferably 10 parts by weight, of aqueous solution of ammonium salt of the acid comonomer prepared in step i); 300-500 parts by weight, more preferably 400 parts by weight, of DMSO; 0.2-0.5 parts by weight, more preferably 0.3 parts by weight, of 2-2'-azobisisobutyronitrile AIBN and 0.05-0.15 parts by weight, more preferably 0.1 parts by weight, of dodecyl-mercaptan or octylmercaptan.

In step iii) for keeping the mixture obtained in step ii) under stirring, the temperature can preferably vary from 65 to 75° C., for a time that ranging from 10 to 20 hours, preferably from 12 to 15 hours.

The present invention allows a solution of acrylonitrile copolymers, gel-free and without the formation of insoluble agglomerates to be obtained, increasing the advantages associated with solution polymerization, but eliminating the dangerous and expensive step of treating the dope or solvent with gaseous ammonia, this treatment being necessary for obtaining polymer solutions with improved spinability and with an improved performance in the subsequent oxidation and carbonization phases.

Furthermore, steps vi) and vii), thanks to the presence of water in the polymer solution and unreacted comonomer, do not jeopardize the recovery and recycling process of the polymerization reagents. It is also possible to reach low levels of residual comonomer (in particular acrylonitrile), reaching residues in the order of 200-300 ppm and consequently improving the safety of the environmental conditions in the subsequent processing steps.

A further advantage of the process according to the present invention is determined by the specific quantity of water contained in the spinning or dope solution which is then fed to the spinning step: the percentage of water that remains in the homogeneous solution for the production of acrylic fibers obtained with the process according to the present invention, is in fact absolutely compatible with the acrylic fiber spinning technologies both according to the dry or wet spinning technology and according to the DJWS technology (dry jet wet spinning or air gap): it is therefore not necessary to completely remove the water from the solution destined for spinning.

Furthermore, the presence of small percentages of water in the acrylic fiber spinning solutions as claimed in U.S. Pat. No. 3,932,577, facilitates the compatibility of the solution itself with the coagulation bath, leading to a fiber free of vacuoles and cracks.

Another advantage of the presence of water in the polymerization process is the possibility of using both fresh acrylonitrile generally containing small quantities of water (approximately 0.5% by weight) without proceeding with its purification, and acrylonitrile recovered from the demonomerization process, also containing small amounts of water. The presence in the main comonomer of small but variable quantities of water does not represent a problem as the total quantity of water in the reaction system is adjusted to the desired value, and is exactly reproducible in the various batches, by adding the aqueous solution of the acid comonomer salified with ammonia in a quantity that always guarantees the same water content in the system.

In the present description, the term polymer refers to copolymers obtained starting from acrylonitrile and one or more other co-monomers (acrylonitrile in a quantity ranging from 95 to 99.5% by weight with respect to the total weight of the polymer and one or more other co-monomers monomers in a quantity generally ranging from 0.5 to 5% by weight with respect to the total weight of the polymer).

The preferred co-monomers are molecules bearing one or more acid groups such as acrylic acid, itaconic acid, sulfonated styrenes and analogues and optionally neutral vinyl molecules such as methyl acrylate, methyl methyl acrylate, vinyl acetate, acrylamide and analogues.

In particular, the polymers are high-molecular-weight polymers, ranging from 100,000 to 300,000 Da.

The dimethylsulfoxide (DMSO) solvent is selected for its characteristics of low environmental impact and limited toxicity.

The spinning or dope solution, obtained at the end of step vii), can be used immediately for feeding a suitable spinning line or it can be stored in heated tanks.

The solution is sent to a battery of filter presses, with selectivity cloths from 40 μm to 5 μm for the removal of any particles and, subsequently, to the spinning line.

The spinning line used can be of the wet-spinning type with spinnerets immersed in a coagulation bath consisting of a mixture of water and solvent. After coagulation, the bundle of filaments is stretched and washed in succession according to the known art to produce tows which are collected on bobbins or in boxes and then sent to the carbonization line for the production of carbon fiber.

Alternatively, the spinning line used can be of the dry-jet wet spinning type (air-gap spinning) with spinnerets kept in the air at a small distance from the surface of the coagulation bath consisting of a mixture of water and solvent. After coagulation, the bundle of filaments is stretched and washed in succession according to the known art to produce tows which are collected on bobbins or in boxes and then sent to the carbonization line for the production of carbon fiber.

EXAMPLES

By way of non-limiting example of the present invention, some implementation examples of the process according to the present invention are provided hereunder.

Example 1

99 kg of acrylonitrile, 400 kg of DMSO, 0.1 kg of n-octyl mercaptan and 15 kg of an aqueous solution containing 1 kg of itaconic acid, 0.25 kg of ammonia and 13.75 kg of water, were introduced at room temperature into a stainless steel reactor equipped with a stirrer and cooling jacket. The solution thus obtained was then heated to a temperature of 65° C. and 0.3 kg of 2-2'-azobisisobutyronitrile (AIBN)

were added. The reaction heat was removed by circulating cold water in the cooling jacket of the reactor and the solution kept under stirring for 7 hours at 65° C.; the temperature was then increased to 72° C. and the system was kept under stirring for a further 7 hours. Under the conditions indicated, a conversion of the acrylonitrile fed equal to 90.4% was obtained.

At the end of the above period, the contents of the reactor were discharged into a tank kept at a temperature of 35° C. and subsequently fed to a thin film evaporator (TFE) kept at a temperature of 80° C. and with a residual pressure of 25 mbars.

A mixture containing acrylonitrile, water and DMSO was collected from the TFE head and incorporated in the feeding mixture to the reactor.

A homogeneous solution of co-polymer having a viscosity of 450 Poises at 60° C. and containing a residual quantity of acrylonitrile equal to 0.03% by weight was collected from the bottom of the TFE.

The dope thus produced was fed to a wet-spinning line with 24,000-hole spinnerets immersed in a coagulation bath containing 60% of DMSO and 40% of water and kept at 55° C. The bundle of filaments thus obtained was stretched, in succession, 10 times its initial length and washed. At the end of the stretching and washing section, the tow was collected on bobbins at a rate of 70 m/min, obtaining bobbins of precursor of 24 k having the following characteristics:
Titer: 1.22 dtex;
Tenacity: 59.5 cN/tex:
Elongation: 14.5%;
suitable for the production of carbon fiber.

Example 2

97 kg of acrylonitrile, 2 kg of methyl acrylate, 400 kg of DMSO, 0.1 kg of dodecylmercaptan and 15 kg of an aqueous solution containing 1 kg of itaconic acid, 0.250 kg of ammonia and 13.75 kg of water, were introduced at room temperature into a stainless steel reactor equipped with a stirrer and cooling jacket. The solution thus obtained was then heated to a temperature of 65° C. and 0.3 kg of 2-2'-azobisisobutyronitrile (AIBN) were added. The reaction heat was removed by circulating cold water in the cooling jacket of the reactor and the solution kept under stirring for 10 hours at 65° C.; the temperature was then increased to 70° C. and the system was kept under stirring for a further 10 hours. Under the conditions indicated, a conversion of the acrylonitrile fed equal to 91.8% was obtained.

At the end of the above period, the contents of the reactor were discharged into a tank kept at a temperature of 35° C. and subsequently fed to a thin film evaporator (TFE) kept at a temperature of 80° C. and with a residual pressure of 25 mbars.

A mixture containing acrylonitrile, water and DMSO was collected from the TFE head, which was sent to the feeding to the reactor.

A homogeneous solution of co-polymer having a viscosity of 420 Poises at 60° C. and containing a residual quantity of acrylonitrile equal to 0.03% by weight was collected from the bottom of the TFE.

The dope thus produced was fed to a line of the wet-spinning type with 48,000-hole spinnerets immersed in a coagulation bath containing 60% of DMSO and 40% of water and kept at 55° C. The bundle of filaments thus obtained was stretched, in succession, 10 times its initial length and washed. At the end of the stretching and washing section, the tow was collected using suitable crosslappers at a rate of 60 m/min, obtaining boxes of precursor of 48 K having the following characteristics:
Titer: 1.25 dtex;
Tenacity: 56.2 cN/tex:
Elongation: 13.6%;
suitable for the production of carbon fiber.

Example 3

A spinning solution in DMSO was produced according to the procedure described in Example 1.

The dope thus produced was fed to a dry-jet wet spinning line with spinnerets having 3,000 holes positioned at a distance of 4 mm from the surface of the coagulation bath, containing 35% of DMSO and 65% of water, at a temperature of 5° C. The bundle of filaments obtained after coagulation was stretched in water and subsequently in steam (steam stretching) nine times its initial length and finally washed to remove the solvent still present. At the end of the stretching and washing section, bobbins of precursor of 12 K were obtained by the overlapping of four 3K tows coming from the single spinneret. The fiber obtained, collected on bobbins at a rate of 240 m/min, has a perfectly round section, is compact, free of cracks and shows the following characteristics:
Titer: 1.0 dtex;
Tenacity: 65.3 cN/tex:
Elongation: 14.1%;
suitable for the production of carbon fiber.

The invention claimed is:

1. A process for the production of a carbon fiber precursor comprising:
   i) preparing an acid comonomer solution selected from the group consisting of itaconic acid and acrylic acid in water containing at least a stoichiometric quantity of ammonia with respect to the acid groups present, wherein the concentration of acid comonomer in water varies within the range of 3% to 50% by weight, the total quantity of water fed to a reactor ranging from 1 to 5% by weight with respect to a total weight of a mass charged into the reactor in step ii);
   ii) feeding into the reactor, acrylonitrile or a mixture of acrylonitrile and a neutral vinyl comonomer, the acrylonitrile or two comonomers acrylonitrile/neutral vinyl comonomer being present in a weight ratio ranging from 95:5 to 99.5:0.5, an aqueous solution of ammonium salt of the acid comonomer prepared in step i), DMSO, 2-2'-azobisisobutyronitrile AIBN and dodecylmercaptan or octylmercaptan;
   iii) keeping the mixture from step ii) under stirring at a temperature ranging from 50 to 80° C., for a time ranging from 12 to 15 hours;
   iv) discharging the contents of the reactor into a tank kept at a temperature ranging from 35 to 40° C. to slow down or interrupt the reaction;
   v) feeding the mixture obtained from step iv) to a thin-film evaporation system (TFE) operating at a temperature ranging from 40 to 80° C., and at a pressure ranging from 5 to 30 mbar abs;
   vi) collecting a mixture of acrylonitrile, water and DMSO from a head of the TFE, said mixture being re-used in the preparation of a new reaction batch;
   vii) collecting a polymer solution in DMSO from a bottom of the TFE, said solution being diluted with fresh DMSO to reach a concentration ranging from 15 to 25% by weight with respect to the total weight of the solution and obtaining a homogeneous solution;

viii) feeding the homogeneous solution obtained at the end of step vii) to a following spinning step or to a storage tank.

2. The process according to claim 1, wherein the spinning step is carried out by means of the wet spinning process or the dry-jet wet spinning process.

3. The process according to claim 1, wherein the homogeneous solution obtained in step vii) is sent to a coagulation step in a coagulation bath consisting of a mixture of water and solvent, the bundle of filaments obtained being stretched and washed in succession to a length of approximately 10 times the initial length and then subjected to a final washing step with water to remove the solvent, prior to feeding to step viii).

4. The process according to claim 3, wherein the bundle of filaments obtained is collected on bobbins or in boxes.

5. The process according to claim 1, wherein in step i) for the preparation of the acid comonomer solution, the concentration of acid comonomer in water varies within the range of 5% to 30% by weight, the total quantity of water fed to the reactor ranging from 1 to 5% by weight with respect to the total weight of the mass charged into the reactor in step ii) of the process according to the present invention.

6. The process according to claim 1, wherein in step i), the neutral vinyl comonomer is selected from the group consisting of methyl acrylate and vinyl acetate.

7. The process according to claim 1, wherein in step ii), 90-150 parts by weight of acrylonitrile or a mixture of acrylonitrile and a neutral vinyl comonomer are fed, the two comonomers acrylonitrile/neutral vinyl comonomer being present in a weight ratio ranging from 95:5 to 99.5:0.5; 2-15 parts by weight of aqueous solution of ammonium salt of the acid comonomer prepared in step i); 300-500 parts by weight of DMSO; 0.2-0.5 parts by weight of 2-2'-azobisisobutyronitrile AIBN and 0.05-0.15 parts by weight of dodecylmercaptan or octylmercaptan.

8. The process according to claim 7, wherein in step ii), 100 parts by weight of acrylonitrile or a mixture of acrylonitrile and a neutral vinyl comonomer are fed, the two comonomers acrylonitrile/neutral vinyl comonomer being present in a weight ratio ranging from 95:5 to 99.5:0.5; 10 parts by weight of aqueous solution of ammonium salt of the acid comonomer prepared in step i); 400 parts by weight of DMSO; 0.3 parts by weight of 2-2'-azobisisobutyronitrile AIBN and 0.1 parts by weight of dodecylmercaptan or octylmercaptan.

9. The process according to claim 1, wherein the mixture obtained by step ii) is kept stirring for a time ranging from 12 to 15 hours.

10. The process according to claim 1, wherein the polymer solution collected from the bottom of the TFE is diluted with fresh DMSO to reach a concentration ranging from 18 to 22% by weight, with respect to the total weight of the solution.

11. The process according to claim 1, wherein the mixture obtained in step ii) is kept stirring at a temperature ranging from 65 to 75° C.

* * * * *